United States Patent [19]

Youngquist et al.

[11] Patent Number: 5,710,377
[45] Date of Patent: Jan. 20, 1998

[54] ULTRASONIC LEAK DETECTION SYSTEM

[75] Inventors: Robert C. Youngquist, Cocoa, Fla.; J. Steven Moerk, Taylorsville, N.C.

[73] Assignee: The United States of America as represented by the Administrator of the National Aeronautics and Space Administration, Washington, D.C.

[21] Appl. No.: 540,616

[22] Filed: Oct. 17, 1995

[51] Int. Cl.⁶ .................... G01H 13/00; G01M 3/24
[52] U.S. Cl. .................... 73/584; 73/40.5 A; 73/585
[58] Field of Search .................... 73/584, 585, 587, 73/588, 592, 593, 661, 40.5 A; 367/118, 129, 140, 178, 191

[56] References Cited

U.S. PATENT DOCUMENTS

| | | | |
|---|---|---|---|
| Re. 33,977 | 6/1992 | Goodman et al. | 73/40.5 A |
| 2,961,869 | 11/1960 | Bagno | 73/40.5 A |
| 3,192,516 | 6/1965 | Simpkins et al. | 73/40.5 A |
| 3,222,635 | 12/1965 | Simpkins | 73/40.5 A |
| 3,289,465 | 12/1966 | Parker | 73/40.5 A |
| 3,308,424 | 3/1967 | Simpkins et al. | 73/40.5 A |
| 3,500,676 | 3/1970 | Palmer | 73/40.5 A |
| 3,588,358 | 6/1971 | Rudmose | 73/585 |
| 3,645,129 | 2/1972 | Grant | 73/588 |
| 4,060,701 | 11/1977 | Epley | 73/584 |
| 4,433,398 | 2/1984 | Kodera et al. | 367/140 |
| 4,581,727 | 4/1986 | Harper et al. | 367/118 |
| 4,583,405 | 4/1986 | Simmons | 73/584 |
| 4,583,406 | 4/1986 | Dimeff | 73/40.5 A |
| 4,635,042 | 1/1987 | Andrews | 340/605 |
| 4,911,012 | 3/1990 | Ziska | 73/584 |
| 4,964,100 | 10/1990 | Srour et al. | 367/178 |
| 4,991,439 | 2/1991 | Betts | 73/587 |
| 5,341,670 | 8/1994 | Brook et al. | 73/40.5 A |

FOREIGN PATENT DOCUMENTS

| | | | |
|---|---|---|---|
| 300812 | 6/1971 | U.S.S.R. | 73/40.5 A |
| 442415 | 11/1974 | U.S.S.R. | 73/40.5 A |

*Primary Examiner*—Hezron E. Williams
*Assistant Examiner*—Helen C. Kwok
*Attorney, Agent, or Firm*—Beth A. Vrioni

[57] ABSTRACT

A system for detecting ultrasonic vibrations, such as those generated by a small leak in a pressurized container, vessel, pipe, or the like, comprises an ultrasonic transducer assembly and a processing circuit for converting transducer signals into an audio frequency range signal. The audio frequency range signal can be used to drive a pair of headphones worn by an operator. A diode rectifier based mixing circuit provides a simple, inexpensive way to mix the transducer signal with a square wave signal generated by an oscillator, and thereby generate the audio frequency signal. The sensitivity of the system is greatly increased through proper selection and matching of the system components, and the use of noise rejection filters and elements. In addition, a parabolic collecting horn is preferably employed which is mounted on the transducer assembly housing. The collecting horn increases sensitivity of the system by amplifying the received signals, and provides directionality which facilitates easier location of an ultrasonic vibration source.

20 Claims, 5 Drawing Sheets

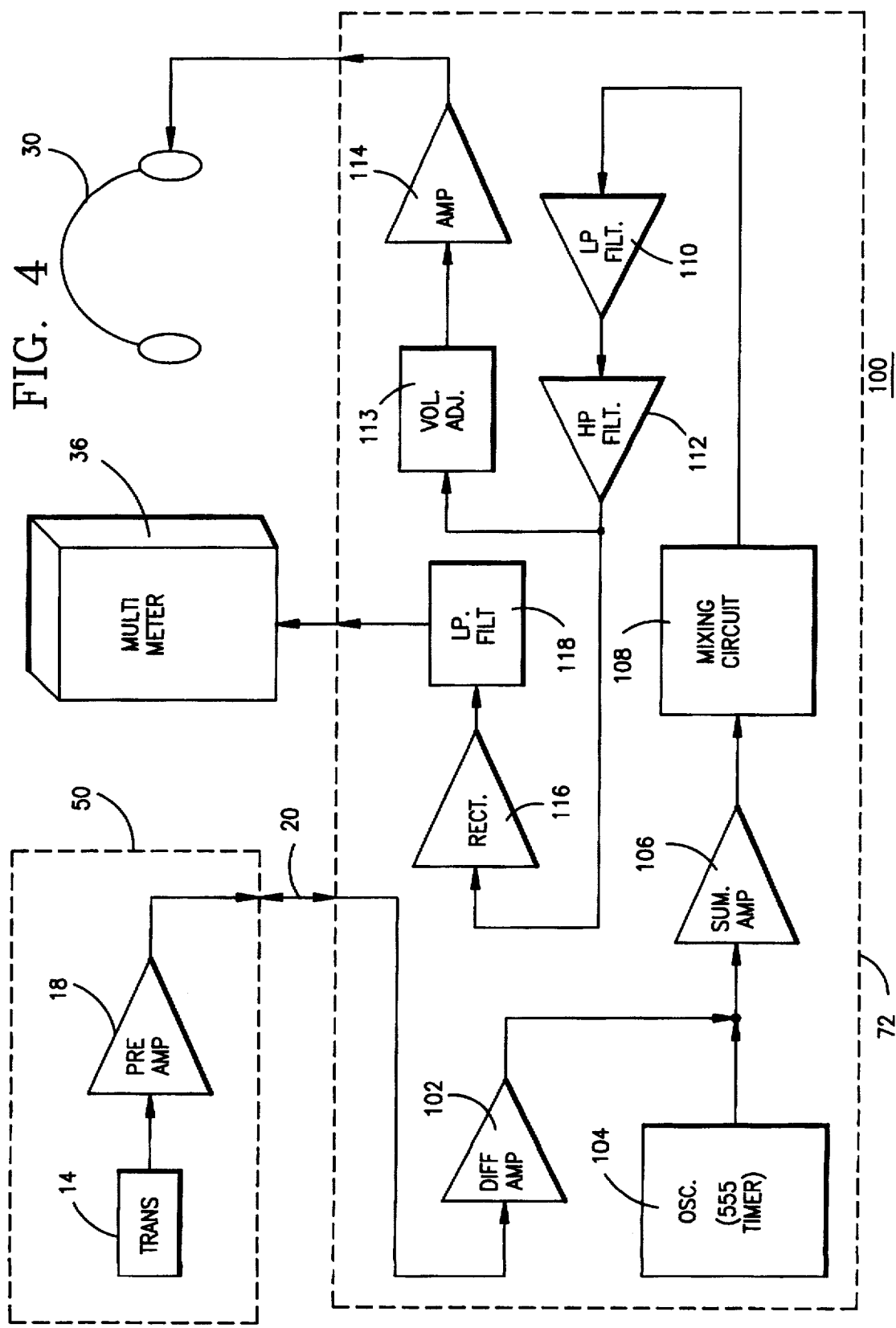

FIG. 6
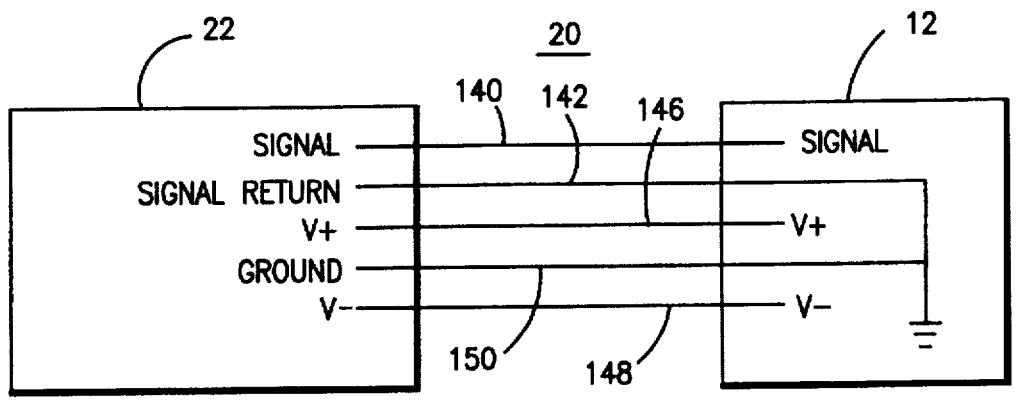
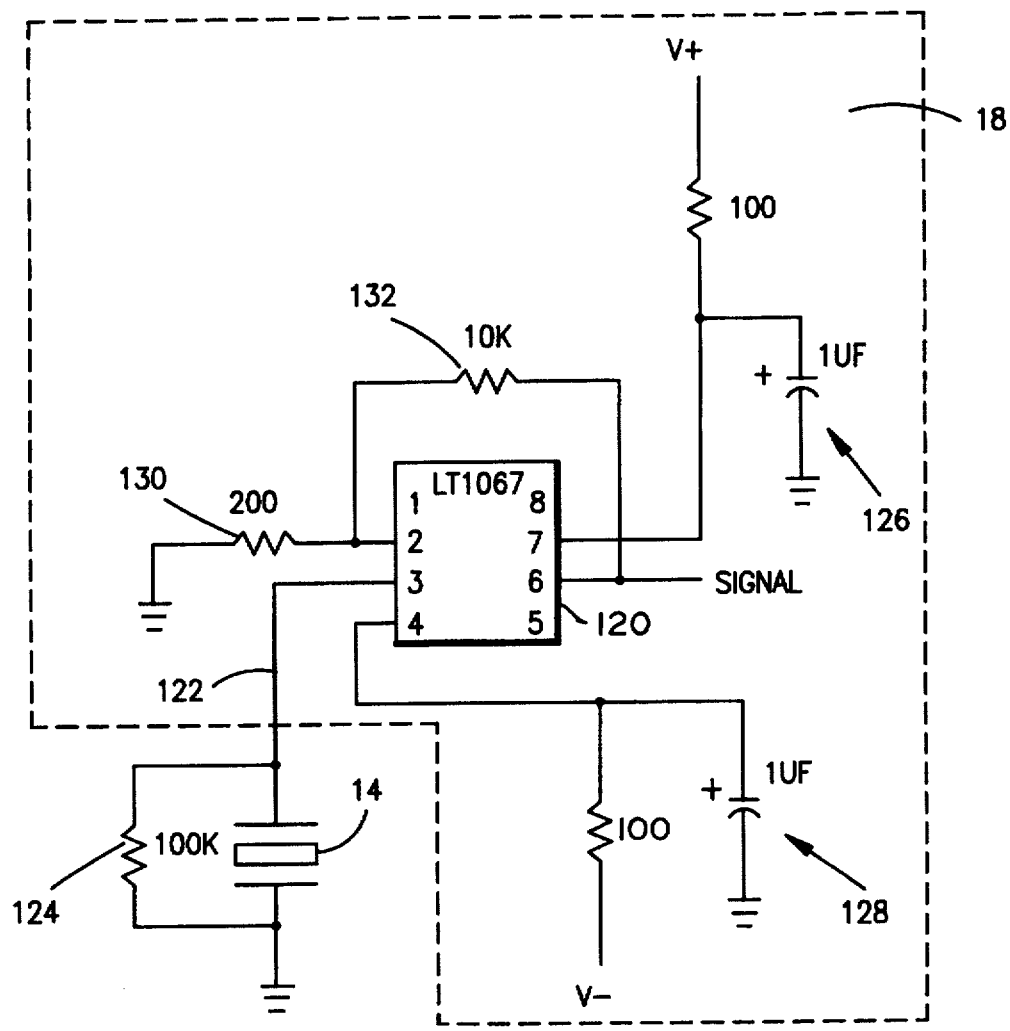
FIG. 5

ULTRASONIC LEAK DETECTION SYSTEM

ORIGIN OF THE INVENTION

The invention described herein was made in the performance of work for the U.S. Government under a NASA contract, and is subject to the provisions of Public Law 96-517 (35 USC 202) in which the contractor has elected not to retain title.

BACKGROUND OF THE INVENTION

The present invention relates in general to a system for detecting ultrasonic vibrations, and is particularly suited for detecting leaks in pressurized systems or devices.

Detectors which employ ultrasonic transducers to sense ultrasonic vibrations generated by small leaks in pressurized systems, containers, pipes, etc., are well known. Examples of such detectors may be found in U.S. Pat. Nos. 3,222,635, 3,289,465, 4,635,042 and 5,341,670. Typically, these detectors employ a hand held transducer which is held by an operator near the surface to be inspected. Ultrasonic vibrations detected by the transducer are fed through processing circuitry which usually converts them to audio frequency signals that can be heard by the operator through headphones or a speaker, for example.

Although the designs and operational characteristics of these devices have improved over the years, there are still areas where further improvement is desirable. In particular, if one of these leak detectors is employed to locate a very small leak in a relatively large pressurized container, the existence of the leak may be hard to detect. Further, even if it is detected, the actual location of the leak may be very hard to determine. This is because conventional ultrasonic leak detectors typically employ transducers which respond to ultrasonic vibrations over a very wide range of angles. In addition, the prior art detectors lack sufficient sensitivity and background noise rejection to be able to detect very small leaks quickly and efficiently. Finally, these detectors usually rely upon circuitry and components that are too complex and expensive. As a result, it is not uncommon for an ultrasonic leak detector system to cost in excess of $3,000, and this discourages widespread use of such systems.

SUMMARY OF THE INVENTION

In view of the foregoing, the present invention seeks to provide an improved ultrasonic detector system which is particularly suited for detecting leaks, and provides increased sensitivity, but decreased complexity and cost, over prior art ultrasonic detector systems. This is achieved through the combined effects of three notable system elements. The first is a parabolic collecting horn which is attached to a housing containing the system's ultrasonic transducer, and not only substantially increases the sensitivity of the transducer, but also provides directionality so that the source of a detected leak can be easily located. The second key element is a low noise preamp circuit in the transducer housing which is connected directly to the output of the transducer, and itself provides a two fold increase in sensitivity over conventional detection systems. Finally, the third key element is a signal processing circuit which receives signals from the preamp, and converts the signals to audio band signals that can be heard by an operator through a pair of headphones.

In a preferred embodiment of the invention, the processing circuit is contained with a battery power supply in another housing, and the transducer housing is connected thereto by means of a shielded cable having a plug type electrical connector at one end for reception by a plug jack in the circuit housing. The processing circuit includes a number of amplifiers, an oscillator and a diode rectifier based mixing circuit that are arranged to process the transducer signal in the following manner. First, the received preamplified transducer signal is buffered and amplified further in a first differential amplifier. The signal is then added directly to the scaled output from the oscillator, and this shifts the transducer signal voltage above the voltage needed to bias a diode. As a result, a simple two-diode rectifier and a second differential amplifier can be used as a mixing circuit for the system, thus eliminating the need for a multiplier or mixing circuit chip. The mixing circuit converts the ultrasonic band signal to an audio band signal. This signal is then filtered and amplified to generate an audio band signal suitable for driving a pair of headphones. Optionally, additional circuitry can also be provided to convert the audio signal to a DC voltage for driving a multimeter which provides a visual indication of the detected signal.

Added versatility can also be provided through the use of optional transducer arrangements. The first alternative is simply the transducer with the collecting horn removed, and this allows the transducer to be moved closer to the potential leak source. This arrangement is particularly advantageous in situations where operations personnel need to locate ultrasonic leaks at close range, such as along a weld seam. Although the sensitivity of the transducer is substantially less without the collecting horn, the close proximity of the transducer to the seam or other point of inspection more than makes up for this decrease in sensitivity.

The second alternative transducer arrangement is advantageous in searches for ultrasonic leaks under metal. For this situation, a contact type ultrasonic transducer assembly is preferred in which the transducer is coupled directly to the surface of the metal. In this variation, the transducer is encased in a stainless steel shell which, when pressed in direct contact with the metal to be tested, allows good detection of ultrasonic signals in or under the metal.

BRIEF DESCRIPTION OF THE DRAWINGS

The features and advantages of the present invention will become apparent from the following detailed description of a preferred embodiment thereof, taken in conjunction with the accompanying drawings, in which:

FIG. 4 is a block diagram of the system's operational circuitry; and

FIGS. 5–7 are detailed schematic diagrams of the system's operational circuitry, with FIG. 5 illustrating the transducer preamp circuit, FIG. 6 illustrating the electrical cable for connecting the transducer to the processing circuit, and FIG. 7 illustrating the system's processing circuit.

DETAILED DESCRIPTION OF THE PREFERRED EMBODIMENT

Figure 1:
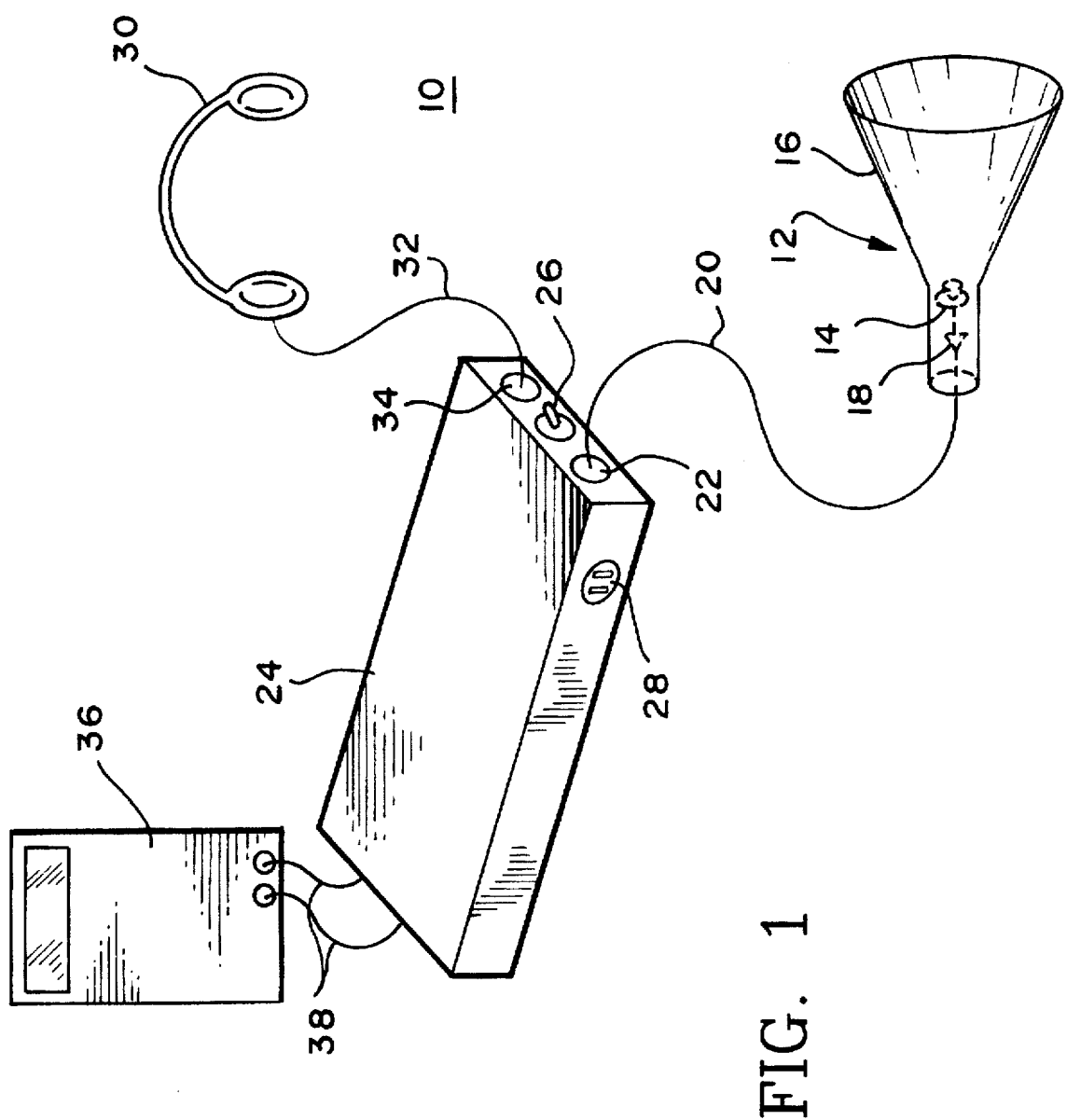
FIG. 1 is a schematic illustration showing the structural components of an ultrasonic detector system constructed in accordance with the preferred embodiment of the present invention.

Turning now to FIG. 1, there is illustrated an ultrasonic detector system 10 which can be employed for detecting and locating a source of ultrasonic vibrations, such as for example, a leak in a pressurized pipe or container. The system 10 includes an ultrasonic transducer assembly 12 which is shown in greater detail in FIG. 2, and comprises an ultrasonic transducer 14, a parabolic collecting horn 16 and a preamp circuit 18. The ultrasonic transducer 14 can be any conventional ultrasonic transducer such as those manufactured by Panasonic or American Piezo Ceramics, for example. One preferred transducer is the 40R16A, which is a 40 kHz ultrasonic receiver made by American Piezo Ceramics, and has very favorable sensitivity and noise characteristics that make it particularly suitable for use in detecting low level ultrasonic vibrations as are typically generated by small leaks.

Figure 3:
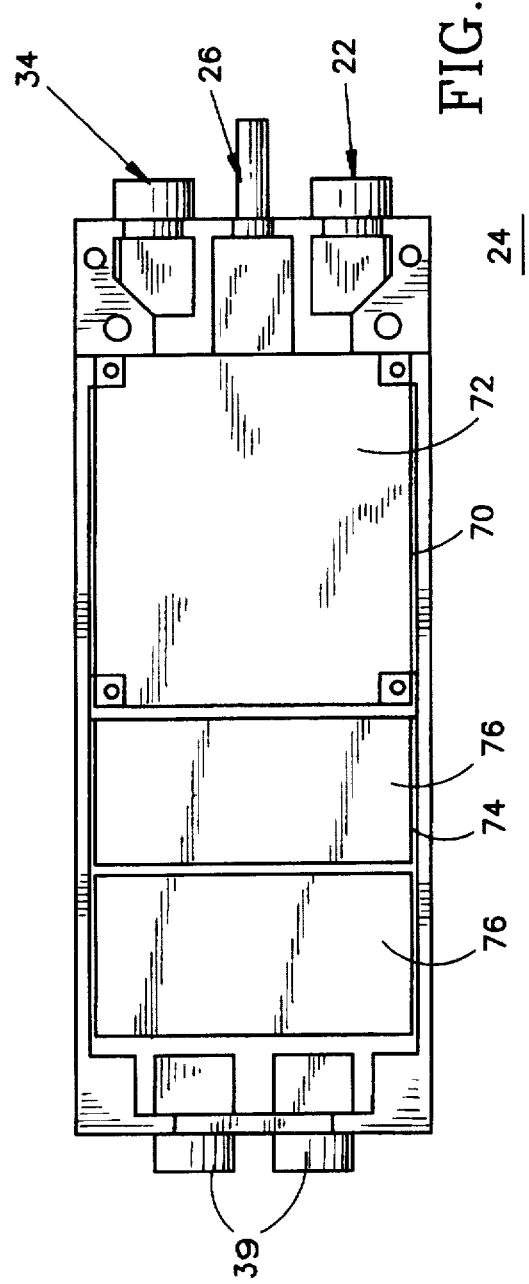
FIG. 3 is a top view of the system's processing circuit housing shown with its top cover removed.

The transducer assembly 12 is removably connected by means of a shielded electrical cable 20 and a plug connector 22 to electronic circuitry contained in a processing circuit housing 24 (see also FIG. 3). The housing 24 is preferably portable with dimensions that permit it to be carried in an operator's pocket. Preferable dimensions for the housing 24 are a length of 5.50 inches, a width of 2.25 inches and a height of 0.90 inches. An on/off switch 26 is disposed in one end of the housing 24 for controlling power to the system 10. A tether 28 and a belt clip (not shown) can also be provided for facilitating convenient handling of the housing 24.

Two devices are employed for providing visual and audible indications of the ultrasonic vibrations detected by the transducer 14. These include a pair of headphones 30 which are removably connected by means of an electrical cable 32 and a connector plug 34 to the circuitry in the housing 24. A conventional multimeter 36 can also be removably connected to the circuitry in the housing 24 by means of a pair of removable leads 38 and associated jacks 39 as illustrated in FIG. 3. The headphones 30 generate an audible sound which is proportional to the magnitude of the detected ultrasonic vibrations, while the multimeter 36 displays a DC voltage value which is proportional to the magnitude of the detected ultrasonic vibrations.

Figure 2:
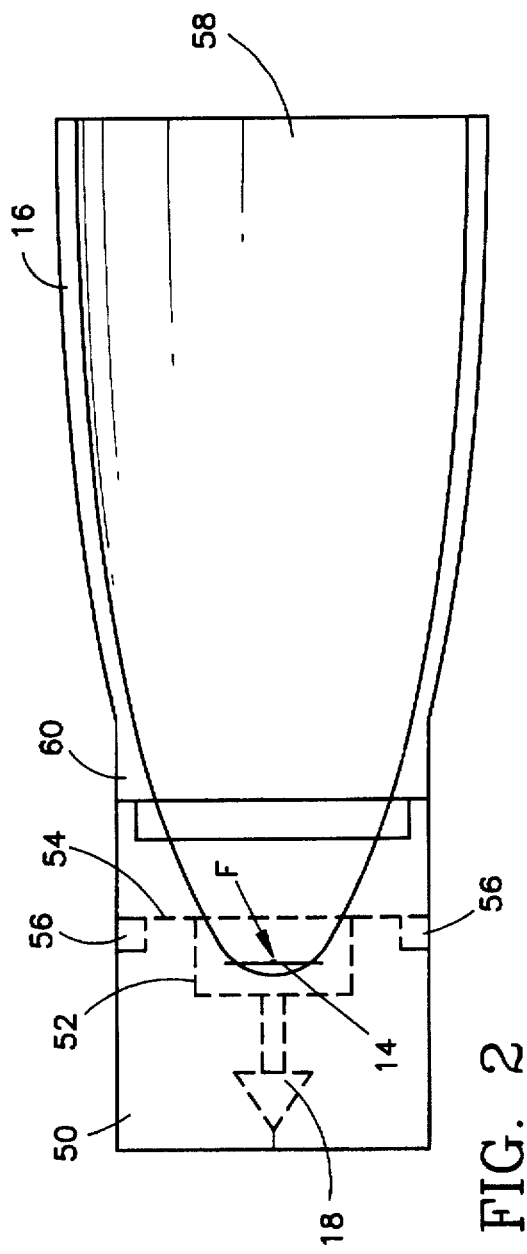
FIG. 2 is a diagrammatic illustration of the system's transducer and collecting horn arrangement.

Turning now to FIG. 2, the ultrasonic transducer assembly 12 is shown in greater detail. The parabolic collecting horn 16 is removably attached by screw threads to a metal (preferably aluminum) base housing 50 which contains the transducer 14, including its own housing 52, and the preamp circuit 18. The reason that the collecting horn 16 is removably attached to the base housing 50 is to enable use of the transducer assembly 12 for detecting leaks in close proximity to a particular portion of a vessel or a container, such as a weld seam, for example.

Alternatively, the base housing 50 can be cut off flush with the front of the transducer housing 52 as indicated by the dashed lines at 54, and the collecting horn 16 can be deleted so that the transducer housing 52 can be held directly in contact with the material to be tested. This is particularly advantageous for applications where ultrasonic vibrations in or under the material are to be detected. In this case, the transducer housing 52 is preferably formed from stainless steel which, when pressed against a metal container, vessel or housing to be tested, allows good detection of ultrasonic signals generated within the container, etc. The aluminum base housing 50 permits hand pressed contact of the transducer assembly 12 against the material to be tested. If the material is ferrous, a magnetic attachment means 56 can be optionally provided to hold the transducer assembly 12 in place against it.

The purpose of the collecting horn 16 is to provide both increased sensitivity and directionality. Preferably, the horn 16 has an inner surface in the shape of a parabola defined by the equation $Y=3X^2$ with a focal point F at which the transducer 14 is positioned approximately ½ of an inch from the bottom of the horn. The horn 16 has a length of approximately 6 inches, and a front opening 58 with a diameter of approximately 3 inches. With this arrangement, the field of view of the transducer 14 is limited to a small range, preferably on the order of approximately 4°. The field of view is important because if it is too large, as is the case with omnidirectional transducers, then it is very difficult to locate the source of the detected ultrasonic vibrations. On the other hand, if the field of view is too small, then it becomes too difficult to scan the surface to be tested fully and accurately. Experiments indicate that the parabolic collecting horn 16 increases the detection sensitivity of the transducer 14 by a factor of approximately 6.

Preferably, the collecting horn 16 is formed from a stiff material, such as plastic, aluminum or fiberglass, for example. The horn 16 has a wall thickness of approximately 1/16 inch along most of its length, but this thickness increases at a base portion 60 where it connects to the base housing 50 to facilitate a sturdy mounting between the base housing 50 and the horn 16.

Turning now to FIG. 3, the processing circuit housing 24 includes a first compartment 70 for reception of a two inch square circuit board 72. A second compartment 74 is provided for reception of first and second 9 volt batteries 76 which provide power to the system 10.

A block diagram of the operational circuitry for the system 10 is illustrated in FIG. 4, and this includes a processing circuit 100 disposed on the circuit board 72 for processing the signal generated by the transducer 14. The transducer 14 generates a low current voltage signal whose magnitude is proportional to the magnitude of incident ultrasonic waves in the range of approximately 38 to 42 kHz (centered at 40 kHz). The transducer signal is immediately passed through the preamp 18 which preferably has a gain of approximately 50, and generates enough current to drive the amplified signal through the cable 20 to a differential amplifier 102 in the processing circuit 100. This further amplifies the incoming signal by a factor of approximately 30, and also serves to reject any noise in the signal that may be picked up by the cable 20.

The amplified output signal from the differential amplifier 102 is added to a 36 kHz square wave signal generated by a local oscillator 104 (preferably a 555 timer), and is directed to a summing amplifier 106 which generates the weighted sum of these two signals. The output from the summing amplifier 106 is directed to a mixing circuit 108. This contains elements which effectively combine the oscillator and transducer signals in such a way that the resulting signal has a frequency which is the difference between the frequency of the transducer signal and the frequency of the oscillator signal, and is thus in the audio frequency range of approximately 2–6 kHz. Details of how the mixing circuit 108 is specifically configured are provided below in conjunction with the description of FIG. 7.

The audio frequency output signal from the mixing circuit 108 is fed through a low pass filter 110 and a high pass filter 112, both of which combine to reject any noise or unwanted signals below or above the 2–6 kHz range. Finally, the filtered signal is fed through a volume adjusting circuit 113 and an audio amplifier 114 for driving the headphones 30. In addition, the signal can also be fed through a DC rectifier circuit 116 that converts the signal to a DC voltage having a magnitude which is proportional to the total magnitude of the signal generated by the transducer 14, and this is fed through a low pass filter 118 to drive the multimeter 36.

Figure 7:
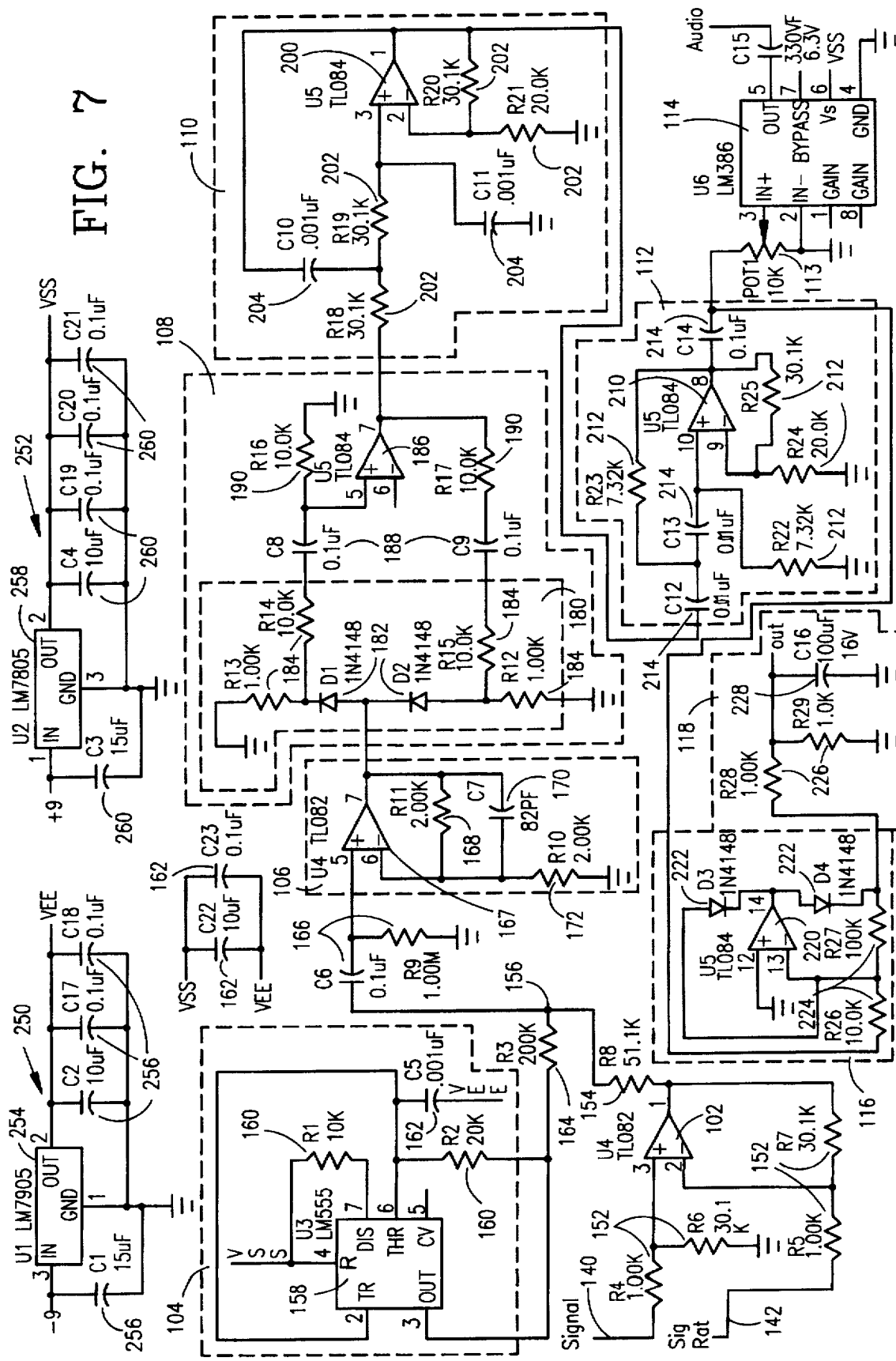

The details of the operational circuitry are illustrated in FIGS. 5–7. Referencing first FIG. 5, the circuit for the preamp 18 is shown in greater detail, and comprises an LT10007 op amp 120 which is selected for its very favorable current and voltage noise characteristics. In tests, the LT10007 op amp has been shown to be very well matched to the characteristics of the 40R16A ultrasonic transducer 14, and combines with the transducer 14 to increase the overall sensitivity of the system 10. It is important, however, that the LT10007 op amp 120 be positioned in close proximity to the transducer 14 to minimize chances that a wire 122 connecting these two elements will pick up external noise that could interfere with the transducer signal. This is the reason that the preamp 18 is disposed in the base housing 50 of the transducer assembly 12 closely adjacent to the transducer 14. The LT10007 op amp 120 has a minimum gain bandwidth product of 5 MHz. Thus, the desired gain of 50 on the 40 kHz transducer signal is within the op amp's operational range.

The other circuit elements in the preamp 18 provide filtering and other functions. In particular, a 100K resistor 124 is connected across the transducer 14 which prevents DC voltage buildup at the op amp 120. The value of the resistor 124 must be greater than a few K-ohm to minimize filtering of the transducer's 40 kHz signal. However, it must be small enough that the preamp performance is not limited by shot noise resulting from op amp input offset current. First and second resistor-capacitor pairs 126 and 128 are also provided which act as power supply filters for the positive and negative power supplies, respectively. Finally, a pair of resistors 130 and 132 are provided which determine the gain of the preamp 18 (value of resistor 132 divided by value of resistor 130).

Turning now to FIG. 6, the shielded electrical cable 20 which connects the output of the preamp 18 with the input of the differential amplifier 102 is illustrated, and it is comprised of five separate wires. A signal wire 140 and a grounded signal return wire 142 form a first twisted pair, while a positive power supply wire 146 and a negative power supply wire 148 form a second twisted pair. These two twisted pairs are surrounded by shielding (not shown) which is connected to a ground wire 150.

Turning now to FIG. 7, the processing circuit 100 is illustrated in greater detail. The differential amplifier 102 compares the signals on the signal line 140 and the signal return line 142. Since the signal return line is connected to ground, any nonground signals induced on this line by noise or other interference will also be induced on the signal line 140. Thus, the output of the differential amplifier 102 is effectively the amplified transducer signal minus any noise or interference component which may be picked up by the cable 20. Preferably, the differential amplifier 102 is a TL082 dual op amp. Two pairs of resistors 152 are associated with the amplifier 102 which set the gain on both inputs to 30.

The buffered, noise filtered and amplified output signal from the differential amplifier 102 is passed through a 51.1 k-ohm resistor 154 to a circuit node 156. The 36 kHz oscillator 104 is preferably comprised of an LM555 timer circuit 158 and associated resistors 160 and capacitors 162. The output on pin 3 of the timer circuit 158 is a square wave, and this is passed through a 200 k-ohm resistor 164 to make the magnitude of the square waves smaller before it is combined with the output of the differential amplifier 102 at the node 156.

The combined signals from the differential amplifier 102 and the oscillator 104 are AC coupled through a capacitor and resistor pair 166 to the input of the summing amplifier 106. The summing amplifier 106, like the differential amplifier 102, is also preferably comprised of a TL082 op amp 167. A resistor 168 and a capacitor 170 are connected between the output and the negative input of the op amp to form a low pass filter whose purpose is to reject switching spikes on the square wave oscillator signal generated by the timer circuit 158. A second resistor 172, having the same value as the resistor 168, is connected between ground and the negative input of the op amp so that the op amp's gain is small. The op amp therefore operates as a buffer to drive the combined weighted sum of the oscillator signal and the transducer signal at the node 156 across the mixing circuit 108.

The mixing circuit 108 is comprised of two key elements. The first is a diode bridge rectifier 180 comprising a pair of diodes 182 and a plurality of resistors 184. The purpose of the diode bridge rectifier 180 is to convert the square wave component of the weighted sum signal into a DC component. The second key element of the mixing circuit 108 comprises a differential amplifier 186, which is preferably a TL084, and has its inputs connected, one each, to the two outputs of the rectifier 180 through a pair of coupling capacitors 188. A pair of resistors 190 control the gain of the differential amplifier 186.

The diode bridge rectifier 180 and the differential amplifier 186 multiply the square wave from the oscillator 104 and the amplified transducer signal from the differential amplifier 102, and this multiplication effectively shifts the frequency of the transducer signal down to the audio range. More specifically, when the transducer signal having a frequency of between 38 and 42 kHz is multiplied by the oscillator signal having a frequency of 36 kHz, the resulting signal has a frequency equal to the difference of the frequency of the transducer signal and the frequency of the oscillator signal, or between 2 and 6 kHz, a range within the audio range. The use of the diode bridge rectifier 180 and the differential amplifier 186 in the foregoing manner eliminates the need for a complex and costly mixing chip, and thus provides a simple, efficient and elegant solution to the problem of converting the ultrasonic signals generated by the transducer 14 to sounds which can be heard by an operator.

The audio signal output from the mixing circuit 108 is next fed sequentially through the low pass filter 110 and then through the high pass filter 112, each of which combines to reject any components of the signal outside of the 2–6 kHz range. The low pass filter 110 is comprised of a TL084 op amp 200 and associated resistors 202 and capacitors 204 configured to provide the desired low pass filtering. Similarly, the high pass filter 112 is also comprised of a TL084 op amp 210 and associated resistors 212 and capacitors 214 configured to provide desired high pass filter function.

Next, the filtered audio signal is fed through the volume adjusting circuit 113 (potentiometer) to the audio amplifier 114, which is preferably an LM386 amplifier that generates enough output current to drive the headphones 30. The filtered audio signal is also fed to the DC rectifier circuit 116 and the other low pass filter 118 for driving the multimeter 36. The rectifier circuit 116 is comprised of a TL084 op amp 220, a pair of diodes 222 and a pair of resistors 224. The low pass filter 118 is comprised simply of a pair of resistors 226 and a capacitor 228.

Finally, FIG. 7 also illustrates a pair of power supply circuits 250 and 252 for supplying a constant 5 volts DC to all of the circuit components of the system 10. The first power supply circuit 250 is comprised of an LM7905 regulator circuit 254 and a group of capacitors 256. This power supply circuit converts the −9 volt output from one of the batteries to the −5 volt VEE power supply output. Similarly, the second power supply circuit 252 comprises an LM7805 regulator circuit 258 and a group of capacitors 260, and this circuit serves to convert a +9 volt battery input to the constant +5 volt VSS power supply output.

In the operation of the ultrasonic detector system 10, the operator first turns the power supply switch 26 on, and then aims the ultrasonic transducer assembly 12 at the item to be inspected. The most common applications of the system include inspections of pressurized vessels, such as rocket housings, fluid carrying pipes, etc. As the operator scans the transducer assembly 12 along the surface of the item being inspected, he or she listens with the headphones 30 for any audible sounds generated by the processing circuit 100 in response to ultrasonic vibrations detected by the transducer 14. With the parabolic collecting horn 16, the source of any detected vibrations can be quickly isolated by closely approaching the item being inspected, and slowly scanning the transducer assembly 12 back and forth along its surface.

Although the present invention has been disclosed in terms of a preferred embodiment, and variations thereon, it will be understood that numerous other modifications and variations could be made thereto without departing from the scope of the invention as defined in the following claims.

What is claimed is:

1. A system for detecting ultrasonic vibrations comprising:
   a) a first housing;
   b) an ultrasonic transducer disposed in said housing for detecting ultrasonic vibrations and generating an electrical signal in response thereto, said transducer including an output for transmitting a transducer signal generated thereby;
   c) a parabolic collecting horn attached to said housing and positioned for collecting and focusing said ultrasonic vibrations onto said transducer; and
   d) a processing circuit electrically connected to said output of said transducer for converting said transducer signal into an audio frequency signal having a magnitude proportional to a magnitude of said transducer signal.

2. The system of claim 1, wherein said processing circuit comprises:
   i) an oscillator for generating an oscillating signal;
   ii) means for forming a weighted sum of said oscillating signal and said transducer signal; and
   iii) a mixing circuit for multiplying an oscillating signal component of the weighted sum and a transducer signal component of the weighted sum, and thereby generating said audio frequency signal having a frequency equal to a difference between a frequency of said transducer signal and a frequency of said oscillating signal, said mixing circuit comprising a diode bridge rectifier generating first and second complimentary outputs, and a differential amplifier having a first, positive input connected to the first output of said diode bridge rectifier, and a second, negative input connected to the second output of said diode bridge rectifier, said differential amplifier generating said audio frequency signal.

3. The system of claim 2, wherein said processing circuit further comprises:

iv) an audio amplifier for amplifying said audio frequency signal generated by said differential amplifier.

4. The system of claim 3, wherein said processing circuit further comprises:
   v) first and second filters disposed in series between an output of said differential amplifier and an input of said audio amplifier, said first filter being a low pass filter, and said second filter being a high pass filter.

5. The system of claim 3, wherein said processing circuit further comprises:
   v) means for converting the audio frequency signal generated by said differential amplifier into a DC voltage having a magnitude proportional to a magnitude of ultrasonic vibrations detected by said ultrasonic transducer; and
   vi) means for applying said DC voltage to a multimeter for providing a visual indication of the magnitude of the detected ultrasonic vibrations.

6. The system of claim 1, wherein said processing circuit further comprises:
   i) means for converting said audio frequency signal into a DC voltage having a magnitude proportional to a magnitude of ultrasonic vibrations detected by said transducer; and
   ii) means for applying said DC voltage to a multimeter for providing a visual representation of said ultrasonic vibrations detected by said transducer.

7. The system of claim 1, further comprising:
   e) a high sensitivity, low noise preamp contained in said first housing, said preamp having an input connected to said output of said ultrasonic transducer, and an output connected to said processing circuit.

8. The system of claim 7, further comprising:
   f) an electrical cable for connecting said preamp to said processing circuit, said electrical cable including first and second wires, said first wire carrying said transducer signal and said second wire being connected to ground; and
   g) means connected to said first and second wires for subtracting a noise signal on said second wire from a signal on said first wire, to thereby form a noise filtered signal to be converted by said processing circuit.

9. The system of claim 1, further comprising:
   e) a second housing containing said processing circuit; and
   f) an electrical cable connected between said first housing and said second housing for electrically connecting said output of said transducer to said processing circuit.

10. The system of claim 1, wherein the transducer is positioned at the focal point of the parabolic collecting horn.

11. A system for detecting ultrasonic vibrations comprising:
   a) an ultrasonic transducer for detecting ultrasonic vibrations and generating an electrical signal in response thereto, said transducer including an output for transmitting a transducer signal generated thereby; and
   b) a processing circuit electrically connected to said output for converting said transducer signal into an audio frequency signal, said processing circuit comprising:
      i) an oscillator for generating an oscillating signal;
      ii) means for forming a weighted sum of said oscillating signal and said transducer signal; and
      iii) a mixing circuit for multiplying an oscillating signal component of the weighted sum and a transducer signal component of the weighted sum, and thereby generating said audio frequency signal having a frequency equal to a difference between a frequency of said transducer signal and a frequency of said oscillating signal, said mixing circuit comprising a diode bridge rectifier generating first and second complimentary outputs, and a differential amplifier having a first, positive input connected to the first output of said diode bridge rectifier, and a second, negative input connected to the second output of said diode bridge rectifier, said differential amplifier generating said audio frequency signal.

12. The system of claim 11, further comprising:

c) a high sensitivity, low noise preamp having an input connected directly to said output of said ultrasonic transducer, and having an output connected to said processing circuit.

13. The system of claim 12, further comprising:

d) a first housing containing said ultrasonic transducer and said preamp;

e) a second housing containing said processing circuit; and f) an electrical cable connecting said output of such preamp to said processing circuit.

14. The system of claim 13, wherein said electrical cable includes first and second wires, said first wire carrying said transducer signal and said second wire being connected to ground, and said processing circuit further includes means connected to said first and second wires for subtracting a noise signal on said second wire from said transducer signal on said first wire, to thereby form a noise filtered signal to be converted by said processing circuit.

15. The system of claim 11, wherein said processing circuit further comprises:

iv) an audio amplifier for amplifying said audio frequency signal generated by said differential amplifier.

16. The system of claim 15, wherein said processing circuit further comprises:

v) first and second filters disposed in series between an output of said differential amplifier and an input of said audio amplifier, said first filter being a low pass filter, and said second filter being a high pass filter.

17. The system of claim 15, wherein said processing circuit further comprises:

v) means for converting the audio frequency signal generated by said differential amplifier into a DC voltage having a magnitude proportional to a magnitude of ultrasonic vibrations detected by said ultrasonic transducer; and vi) means for applying said DC voltage to a multimeter for providing a visual indication of the magnitude of the detected ultrasonic vibrations.

18. The system of claim 11, wherein said processing circuit further comprises:

iv) means for converting said audio frequency signal into a DC voltage having a magnitude proportional to a magnitude of ultrasonic vibrations detected by said transducer; and v) means for applying said DC voltage to a multimeter for providing a visual representation of said ultrasonic vibrations detected by said transducer.

19. The system of claim 11, wherein said ultrasonic transducer further includes a parabolic collecting horn for focusing said ultrasonic vibrations onto said ultrasonic transducer.

20. The system of claim 19, wherein the ultrasonic transducer is positioned at the focal point of the parabolic collecting horn.

* * * * *

US005710377C1

(12) EX PARTE REEXAMINATION CERTIFICATE (4952nd)

United States Patent
Youngquist et al.

(10) Number: US 5,710,377 C1
(45) Certificate Issued: Jun. 29, 2004

(54) ULTRASONIC LEAK DETECTION SYSTEM

(75) Inventors: Robert C. Youngquist, Cocoa, FL (US); J. Steven Moerk, Taylorsville, NC (US)

(73) Assignee: The United States of America as represented by the Administrator of the National Aeronautics and Space Administration, Washington, DC (US)

Reexamination Request:
No. 90/005,762, Jun. 27, 2000

Reexamination Certificate for:
Patent No.: 5,710,377
Issued: Jan. 20, 1998
Appl. No.: 08/540,616
Filed: Oct. 17, 1995

(51) Int. Cl.⁷ .................. G01H 13/00; G01M 3/24
(52) U.S. Cl. .................. 73/584; 73/40.5 A; 73/585
(58) Field of Search ................. 73/584, 585, 587, 73/588, 592, 593, 661, 40.5; 367/118, 129, 140, 178, 191

(56) References Cited

U.S. PATENT DOCUMENTS 5,089,997 A * 2/1992 Pecukonis
RE33,977 E * 6/1992 Goodman et al.
5,432,755 A * 7/1995 Komninos

OTHER PUBLICATIONS

"Ultrasonic Leak Location Systems for Pressurized Cable" product bulletin by Hewlett Packard, dated Apr. 1973.

"Ultrasonic Leak Location Systems" by Hewlett Packard, technical data 1, dated May 1981.

"The Cable Pair Test Equipment Guide" by Communications Technology Corporation, dated Sep. 1989.

"Electronics Engineers' Handbook" by Donald G. Fink and Donald Christiansen, 1989.

* cited by examiner

Primary Examiner—Helen Kwok

(57) ABSTRACT

A system for detecting ultrasonic vibrations, such as those generated by a small leak in a pressurized container, vessel, pipe, or the like, comprises an ultrasonic transducer assembly and a processing circuit for converting transducer signals into an audio frequency range signal. The audio frequency range signal can be used to drive a pair of headphones worn by an operator. A diode rectifier based mixing circuit provides a simple, inexpensive way to mix the transducer signal with a square wave signal generated by an oscillator, and thereby generate the audio frequency signal. The sensitivity of the system is greatly increased through proper selection and matching of the system components, and the use of noise rejection filters and elements. In addition, a parabolic collecting horn is preferably employed which is mounted on the transducer assembly housing. The collecting horn increases sensitivity of the system by amplifying the received signals, and provides directionality which facilitates easier location of an ultrasonic vibration source.

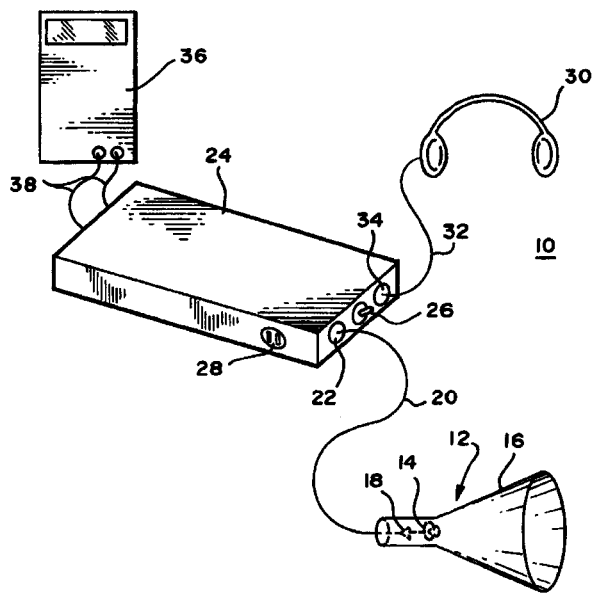

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–20 is confirmed.

New claims 21–23 are added and determined to be patentable.

21. *A system for detecting ultrasonic vibrations comprising:*

*a) a first housing;*

*b) an ultrasonic transducer disposed in said housing for detecting ultrasonic vibrations and generating an electrical signal in response thereto, said transducer including an output for transmitting a transducer signal generated thereby;*

*c) a parabolic collecting horn attached to said housing and positioned for collecting and focusing said ultrasonic vibrations onto said transducer, said parabolic collecting horn having a front end defined by a front opening and a base end opposite said front end and attached to said housing, wherein said transducer is positioned in said collecting horn adjacent said base end and facing said front opening to receive ultrasonic vibrations entering said front opening and being directed by said horn toward said base end; and*

*d) a processing circuit electrically connected to said output of said transducer for converting said transducer signal into an audio frequency signal having a magnitude proportional to a magnitude of said transducer signal.*

22. *The system of claim 21, further comprising:*

*e) a high sensitivity, low noise preamp contained in said first housing, said preamp having an input connected directly to said output of said ultrasonic transducer, and an output connected to said processing circuit.*

23. *The system of claim 21, wherein the transducer is positioned at a focal point of the parabolic collecting horn adjacent said base end.*

\* \* \* \* \*